US009321461B1

(12) United States Patent
Silver et al.

(10) Patent No.: US 9,321,461 B1
(45) Date of Patent: Apr. 26, 2016

(54) CHANGE DETECTION USING CURVE ALIGNMENT

(71) Applicant: Google Inc., Mountain View, CA (US)

(72) Inventors: David Harrison Silver, Millbrae, CA (US); David Ian Franklin Ferguson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/472,795

(22) Filed: Aug. 29, 2014

(51) Int. Cl.
*G01C 22/00* (2006.01)
*G05D 1/00* (2006.01)
(Continued)

(52) U.S. Cl.
CPC ........... *B60W 30/0956* (2013.01); *B60W 30/10* (2013.01); *B62D 6/00* (2013.01); *G05D 1/0214* (2013.01); *G08G 1/16* (2013.01)

(58) Field of Classification Search
CPC . B60W 2540/12; B60W 10/20; B60W 30/08; B60W 30/16; B60W 30/09; B60W 40/072; B60W 2550/10; B60W 30/00; G05D 2201/0201; G05D 1/0219; G05D 1/0274; G05D 15/0265; G06T 2207/20016; G06T 17/05; G06T 15/10; G06T 5/50; G06T 7/60; G01C 21/3605; G01C 11/04; G01C 3/10; G01C 7/04; G01C 21/3602
USPC ............. 701/1, 23, 2, 37, 36, 19, 20, 400, 26, 701/41, 423, 527, 425, 519, 22, 3, 532, 701/533; 345/633, 174, 173, 419, 629, 175, 345/206
See application file for complete search history.

(56) References Cited

U.S. PATENT DOCUMENTS

| 1,924,984 A | 8/1933 | Fageol |
| 3,186,508 A | 6/1965 | Lamont |

(Continued)

FOREIGN PATENT DOCUMENTS

| CN | 101073018 A | 11/2007 |
| CN | 101364111 A | 2/2009 |

(Continued)

OTHER PUBLICATIONS

Chinese Office Action for Application No. 201180057954.0 dated Apr. 29, 2015.

(Continued)

*Primary Examiner* — Calvin Cheung
*Assistant Examiner* — Luis A Martinez Borrero
(74) *Attorney, Agent, or Firm* — Lerner, David, Littenberg, Krumholz and Mentlik, LLP

(57) ABSTRACT

Aspects of the disclosure relate to determining whether a feature of map information. For example, data identifying an object detected in a vehicle's environment and including location coordinates is received. This information is used to identify a corresponding feature from pre-stored map information based on a map location of the corresponding feature. The corresponding feature is defined as a curve and associated with a tag identifying a type of the corresponding object. A tolerance constraint is identified based on the tag. The curve is divided into two or more line segments. Each line segment has a first position. The first position of a line segment is changed in order to determine a second position based on the location coordinates and the tolerance constraint. A value is determined based on a comparison of the first position to the second position. This value indicates a likelihood that the corresponding feature has changed.

20 Claims, 12 Drawing Sheets

(51) Int. Cl.
*B60W 30/095* (2012.01)
*G05D 1/02* (2006.01)
*G08G 1/16* (2006.01)
*B60W 30/10* (2006.01)
*B62D 6/00* (2006.01)

(56) References Cited

U.S. PATENT DOCUMENTS

| | | | |
|---|---|---|---|
| 3,324,805 A | 6/1967 | Mulch | |
| 3,596,728 A | 8/1971 | Neville | |
| 4,372,414 A | 2/1983 | Anderson et al. | |
| 4,387,783 A | 6/1983 | Carman | |
| 4,656,834 A | 4/1987 | Elpern | |
| 4,924,795 A | 5/1990 | Ottemann | |
| 4,970,653 A | 11/1990 | Kenue | |
| 4,982,072 A | 1/1991 | Takigami | |
| 5,187,666 A | 2/1993 | Watanabe | |
| 5,415,468 A | 5/1995 | Latarnik et al. | |
| 5,448,487 A | 9/1995 | Arai | |
| 5,470,134 A | 11/1995 | Toepfer et al. | |
| 5,521,579 A * | 5/1996 | Bernhard | B60K 31/0008 180/167 |
| 5,684,696 A | 11/1997 | Rao et al. | |
| 5,774,069 A | 6/1998 | Tanaka et al. | |
| 5,790,403 A | 8/1998 | Nakayama | |
| 5,906,645 A | 5/1999 | Kagawa et al. | |
| 5,913,376 A | 6/1999 | Takei | |
| 5,954,781 A | 9/1999 | Slepian et al. | |
| 6,055,042 A * | 4/2000 | Sarangapani | G01S 13/87 180/167 |
| 6,064,926 A | 5/2000 | Sarangapani et al. | |
| 6,070,682 A | 6/2000 | Isogai et al. | |
| 6,151,539 A | 11/2000 | Bergholz et al. | |
| 6,195,610 B1 | 2/2001 | Kaneko | |
| 6,226,570 B1 | 5/2001 | Hahn | |
| 6,321,147 B1 | 11/2001 | Takeda et al. | |
| 6,332,354 B1 | 12/2001 | Lalor | |
| 6,343,247 B2 | 1/2002 | Jitsukata et al. | |
| 6,385,539 B1 | 5/2002 | Wilson et al. | |
| 6,414,635 B1 | 7/2002 | Stewart et al. | |
| 6,438,472 B1 | 8/2002 | Tano et al. | |
| 6,438,491 B1 | 8/2002 | Farmer | |
| 6,453,056 B2 * | 9/2002 | Laumeyer | G06K 9/00818 340/933 |
| 6,470,874 B1 | 10/2002 | Mertes | |
| 6,504,259 B1 | 1/2003 | Kuroda et al. | |
| 6,516,262 B2 | 2/2003 | Takenaga et al. | |
| 6,560,529 B1 * | 5/2003 | Janssen | G01C 21/28 340/988 |
| 6,591,172 B2 | 7/2003 | Oda et al. | |
| 6,606,557 B2 | 8/2003 | Kotzin | |
| 6,643,576 B1 | 11/2003 | O Connor et al. | |
| 6,832,156 B2 | 12/2004 | Farmer | |
| 6,836,719 B2 | 12/2004 | Andersson et al. | |
| 6,847,869 B2 | 1/2005 | Dewberry et al. | |
| 6,862,524 B1 | 3/2005 | Nagda et al. | |
| 6,876,908 B2 | 4/2005 | Cramer et al. | |
| 6,934,613 B2 | 8/2005 | Yun | |
| 6,963,657 B1 * | 11/2005 | Nishigaki | G01S 11/12 340/901 |
| 7,011,186 B2 | 3/2006 | Frentz et al. | |
| 7,031,829 B2 | 4/2006 | Nisiyama | |
| 7,085,633 B2 | 8/2006 | Nishira et al. | |
| 7,102,496 B1 | 9/2006 | Ernst, Jr. et al. | |
| 7,177,760 B2 | 2/2007 | Kudo | |
| 7,194,347 B2 | 3/2007 | Harumoto et al. | |
| 7,207,304 B2 | 4/2007 | Iwatsuki et al. | |
| 7,233,861 B2 | 6/2007 | Van Buer et al. | |
| 7,327,242 B2 | 2/2008 | Holloway et al. | |
| 7,346,439 B2 | 3/2008 | Bodin | |
| 7,373,237 B2 | 5/2008 | Wagner et al. | |
| 7,394,046 B2 | 7/2008 | Olsson et al. | |
| 7,486,802 B2 | 2/2009 | Hougen | |
| 7,499,774 B2 | 3/2009 | Barrett et al. | |
| 7,499,776 B2 | 3/2009 | Allard et al. | |
| 7,499,804 B2 | 3/2009 | Svendsen et al. | |
| 7,515,101 B1 | 4/2009 | Bhogal et al. | |
| 7,565,241 B2 | 7/2009 | Tauchi | |
| 7,579,942 B2 | 8/2009 | Kalik | |
| 7,656,280 B2 | 2/2010 | Hines et al. | |
| 7,694,555 B2 | 4/2010 | Howell et al. | |
| 7,778,759 B2 | 8/2010 | Tange et al. | |
| 7,818,124 B2 | 10/2010 | Herbst et al. | |
| 7,835,859 B2 | 11/2010 | Bill | |
| 7,865,277 B1 | 1/2011 | Larson et al. | |
| 7,894,951 B2 | 2/2011 | Norris et al. | |
| 7,908,040 B2 | 3/2011 | Howard et al. | |
| 7,956,730 B2 | 6/2011 | White et al. | |
| 7,979,175 B2 | 7/2011 | Allard et al. | |
| 8,024,102 B2 | 9/2011 | Swoboda et al. | |
| 8,050,863 B2 | 11/2011 | Trepagnier et al. | |
| 8,078,349 B1 | 12/2011 | Prada Gomez et al. | |
| 8,095,313 B1 | 1/2012 | Blackburn | |
| 8,099,213 B2 * | 1/2012 | Zhang | G01S 7/4802 340/437 |
| 8,126,642 B2 | 2/2012 | Trepagnier et al. | |
| 8,190,322 B2 | 5/2012 | Lin et al. | |
| 8,194,927 B2 * | 6/2012 | Zhang | G06K 9/00798 382/104 |
| 8,195,341 B2 | 6/2012 | Huang et al. | |
| 8,244,408 B2 | 8/2012 | Lee et al. | |
| 8,244,458 B1 | 8/2012 | Blackburn | |
| 8,260,515 B2 | 9/2012 | Huang et al. | |
| 8,280,601 B2 | 10/2012 | Huang et al. | |
| 8,280,623 B2 | 10/2012 | Trepagnier et al. | |
| 8,311,274 B2 * | 11/2012 | Bergmann | G01C 21/30 382/103 |
| 8,352,111 B2 | 1/2013 | Mudalige | |
| 8,352,112 B2 | 1/2013 | Mudalige | |
| 8,412,449 B2 | 4/2013 | Trepagnier et al. | |
| 8,452,506 B2 | 5/2013 | Groult | |
| 8,634,980 B1 | 1/2014 | Urmson et al. | |
| 8,694,236 B2 * | 4/2014 | Takagi | G01S 17/936 701/300 |
| 8,706,394 B2 | 4/2014 | Trepagnier et al. | |
| 8,718,861 B1 * | 5/2014 | Montemerlo | B60W 30/00 701/26 |
| 8,724,093 B2 * | 5/2014 | Sakai | G01S 7/4802 356/3.01 |
| 8,775,063 B2 * | 7/2014 | Zeng | B60W 40/072 342/107 |
| 8,831,813 B1 * | 9/2014 | Ferguson | B60T 8/32 701/23 |
| 8,855,860 B2 * | 10/2014 | Isaji | B62D 6/00 340/435 |
| 8,874,267 B1 * | 10/2014 | Dolgov | B60W 30/00 700/253 |
| 8,918,277 B2 * | 12/2014 | Niem | G08G 1/096716 340/905 |
| 8,929,604 B2 * | 1/2015 | Platonov | G01C 21/3602 382/104 |
| 8,948,954 B1 * | 2/2015 | Ferguson | B60W 30/12 701/23 |
| 8,949,016 B1 * | 2/2015 | Ferguson | B60Q 1/00 340/436 |
| 8,970,397 B2 * | 3/2015 | Nitanda | G01S 17/42 340/435 |
| 8,972,093 B2 * | 3/2015 | Joshi | G01S 17/42 382/104 |
| 9,008,369 B2 * | 4/2015 | Schofield | G06K 9/00818 348/211.13 |
| 9,062,979 B1 * | 6/2015 | Ferguson | G01C 21/26 |
| 9,081,383 B1 * | 7/2015 | Montemerlo | G05D 1/0212 |
| 9,182,759 B2 * | 11/2015 | Wimmer | B60W 50/14 |
| 2001/0037927 A1 | 11/2001 | Nagler et al. | |
| 2003/0016804 A1 | 1/2003 | Sheha et al. | |
| 2003/0055554 A1 | 3/2003 | Shioda et al. | |
| 2003/0093209 A1 | 5/2003 | Andersson et al. | |
| 2004/0243292 A1 | 12/2004 | Roy | |
| 2005/0012589 A1 | 1/2005 | Kokubu et al. | |
| 2005/0125154 A1 | 6/2005 | Kawasaki | |
| 2005/0149251 A1 | 7/2005 | Donath et al. | |
| 2005/0273251 A1 | 12/2005 | Nix et al. | |
| 2006/0037573 A1 | 2/2006 | Iwatsuki et al. | |

(56) References Cited

U.S. PATENT DOCUMENTS

| | | |
|---|---|---|
| 2006/0082437 A1 | 4/2006 | Yuhara |
| 2006/0089764 A1 | 4/2006 | Filippov et al. |
| 2006/0089765 A1 | 4/2006 | Pack et al. |
| 2006/0089800 A1 | 4/2006 | Svendsen et al. |
| 2006/0173841 A1 | 8/2006 | Bill |
| 2006/0178240 A1 | 8/2006 | Hansel |
| 2006/0276942 A1 | 12/2006 | Anderson et al. |
| 2007/0010942 A1 | 1/2007 | Bill |
| 2007/0142992 A1 | 6/2007 | Gronau et al. |
| 2007/0165910 A1 | 7/2007 | Nagaoka et al. |
| 2007/0225909 A1 | 9/2007 | Sakano |
| 2007/0239331 A1 | 10/2007 | Kaplan |
| 2007/0247281 A1 | 10/2007 | Shimomura |
| 2008/0021628 A1 | 1/2008 | Tryon |
| 2008/0039991 A1 | 2/2008 | May et al. |
| 2008/0040039 A1* | 2/2008 | Takagi ............ G01S 17/936 701/300 |
| 2008/0056535 A1* | 3/2008 | Bergmann ......... G01C 21/30 382/103 |
| 2008/0059015 A1 | 3/2008 | Whittaker et al. |
| 2008/0059048 A1 | 3/2008 | Kessler et al. |
| 2008/0084283 A1 | 4/2008 | Kalik |
| 2008/0120025 A1 | 5/2008 | Naitou et al. |
| 2008/0120171 A1 | 5/2008 | Ikeuchi et al. |
| 2008/0147253 A1 | 6/2008 | Breed |
| 2008/0161987 A1 | 7/2008 | Breed |
| 2008/0167771 A1 | 7/2008 | Whittaker et al. |
| 2008/0183512 A1 | 7/2008 | Benzinger et al. |
| 2008/0188246 A1 | 8/2008 | Sheha et al. |
| 2008/0195268 A1 | 8/2008 | Sapilewski et al. |
| 2008/0277183 A1 | 11/2008 | Huang et al. |
| 2008/0303696 A1 | 12/2008 | Aso et al. |
| 2008/0306969 A1 | 12/2008 | Mehta et al. |
| 2009/0005959 A1 | 1/2009 | Bargman et al. |
| 2009/0082879 A1 | 3/2009 | Dooley et al. |
| 2009/0115594 A1 | 5/2009 | Han |
| 2009/0164071 A1 | 6/2009 | Takeda |
| 2009/0198400 A1 | 8/2009 | Allard et al. |
| 2009/0248231 A1 | 10/2009 | Kamiya |
| 2009/0276154 A1 | 11/2009 | Subramanian et al. |
| 2009/0287367 A1 | 11/2009 | Salinger |
| 2009/0287368 A1 | 11/2009 | Bonne |
| 2009/0306834 A1 | 12/2009 | Hjelm et al. |
| 2009/0319096 A1 | 12/2009 | Offer et al. |
| 2009/0319112 A1 | 12/2009 | Fregene et al. |
| 2009/0322872 A1* | 12/2009 | Muehlmann ......... G01S 11/12 348/142 |
| 2009/0326799 A1 | 12/2009 | Crook |
| 2010/0010699 A1 | 1/2010 | Taguchi et al. |
| 2010/0014714 A1* | 1/2010 | Zhang ............ G06K 9/00798 382/104 |
| 2010/0017056 A1 | 1/2010 | Asakura et al. |
| 2010/0052945 A1 | 3/2010 | Breed |
| 2010/0066587 A1 | 3/2010 | Yamauchi et al. |
| 2010/0076640 A1 | 3/2010 | Maekawa et al. |
| 2010/0079590 A1 | 4/2010 | Kuehnle et al. |
| 2010/0179715 A1 | 7/2010 | Puddy |
| 2010/0179720 A1 | 7/2010 | Lin et al. |
| 2010/0191433 A1 | 7/2010 | Groult |
| 2010/0205132 A1 | 8/2010 | Taguchi |
| 2010/0228419 A1 | 9/2010 | Lee et al. |
| 2010/0241297 A1 | 9/2010 | Aoki et al. |
| 2010/0253542 A1 | 10/2010 | Seder et al. |
| 2010/0256836 A1 | 10/2010 | Mudalige |
| 2011/0010131 A1* | 1/2011 | Miyajima ............ B60T 7/18 702/181 |
| 2011/0071718 A1 | 3/2011 | Norris et al. |
| 2011/0137520 A1 | 6/2011 | Rector et al. |
| 2011/0150348 A1 | 6/2011 | Anderson |
| 2011/0206273 A1 | 8/2011 | Plagemann et al. |
| 2011/0210866 A1 | 9/2011 | David et al. |
| 2011/0213511 A1 | 9/2011 | Visconti et al. |
| 2011/0246156 A1 | 10/2011 | Zecha et al. |
| 2011/0254655 A1 | 10/2011 | Maalouf et al. |
| 2011/0264317 A1 | 10/2011 | Druenert et al. |
| 2012/0053775 A1 | 3/2012 | Nettleton et al. |
| 2012/0083960 A1* | 4/2012 | Zhu ............ G05D 1/0214 701/23 |
| 2012/0114178 A1 | 5/2012 | Platonov et al. |
| 2012/0157052 A1 | 6/2012 | Quade |
| 2012/0271483 A1* | 10/2012 | Samukawa ......... B60W 50/14 701/1 |
| 2012/0277947 A1 | 11/2012 | Boehringer et al. |
| 2012/0283912 A1 | 11/2012 | Lee et al. |
| 2013/0054049 A1 | 2/2013 | Uno |
| 2013/0054106 A1 | 2/2013 | Schmudderich et al. |
| 2013/0054128 A1* | 2/2013 | Moshchuk ......... G08G 1/167 701/301 |
| 2013/0144520 A1 | 6/2013 | Ricci |
| 2013/0179382 A1 | 7/2013 | Fritsch et al. |
| 2013/0282277 A1 | 10/2013 | Rubin et al. |
| 2013/0321400 A1* | 12/2013 | van Os ............ G06T 15/005 345/419 |
| 2013/0321422 A1* | 12/2013 | Pahwa ............ G06T 11/203 345/428 |
| 2014/0067187 A1* | 3/2014 | Ferguson ............ B60W 30/00 701/28 |
| 2014/0088855 A1* | 3/2014 | Ferguson ............ G08G 1/166 701/117 |
| 2014/0156164 A1 | 6/2014 | Schuberth et al. |
| 2014/0195138 A1* | 7/2014 | Stelzig ............ G08G 1/0116 701/119 |
| 2014/0214255 A1* | 7/2014 | Dolgov ............ G05D 1/0248 701/23 |
| 2014/0350836 A1* | 11/2014 | Stettner ............ B60Q 1/0023 701/301 |
| 2014/0369168 A1* | 12/2014 | Max ............ G01S 15/878 367/93 |
| 2015/0153735 A1* | 6/2015 | Clarke ............ B60W 30/00 701/301 |
| 2015/0177007 A1* | 6/2015 | Su ............ G01C 21/34 701/25 |
| 2015/0198951 A1* | 7/2015 | Thor ............ B60W 10/04 701/23 |
| 2015/0203107 A1* | 7/2015 | Lippman ............ B60W 30/00 701/23 |
| 2015/0293216 A1* | 10/2015 | O'Dea ............ G01S 13/04 701/23 |

FOREIGN PATENT DOCUMENTS

| | | |
|---|---|---|
| CN | 101522493 A | 9/2009 |
| DE | 10218010 A1 | 11/2003 |
| DE | 10336986 A1 | 3/2005 |
| DE | 102009010006 A1 | 10/2009 |
| EP | 0884666 A1 | 12/1998 |
| EP | 2216225 A1 | 8/2010 |
| JP | 09066853 | 3/1997 |
| JP | 09-160643 A | 6/1997 |
| JP | H09-161196 A | 6/1997 |
| JP | 11282530 A | 10/1999 |
| JP | 2000149188 A | 5/2000 |
| JP | 2000-193471 A | 7/2000 |
| JP | 2000305625 A | 11/2000 |
| JP | 2000-338008 A | 12/2000 |
| JP | 2001-101599 A | 4/2001 |
| JP | 2002236993 A | 8/2002 |
| JP | 2002251690 A | 9/2002 |
| JP | 2003081039 A | 3/2003 |
| JP | 2003162799 A | 6/2003 |
| JP | 2004-206510 A | 7/2004 |
| JP | 2004-326730 A | 11/2004 |
| JP | 2005067483 A | 3/2005 |
| JP | 2005071114 A | 3/2005 |
| JP | 2005-339181 A | 12/2005 |
| JP | 2006322752 A | 11/2006 |
| JP | 2007001475 A | 1/2007 |
| JP | 2008117082 A | 5/2008 |
| JP | 2008152655 A | 7/2008 |
| JP | 2008170404 A | 7/2008 |
| JP | 2008290680 A | 12/2008 |
| JP | 2009053925 A | 3/2009 |
| WO | 0070941 A1 | 11/2000 |
| WO | 0188827 A1 | 11/2001 |

(56) References Cited

FOREIGN PATENT DOCUMENTS

| WO | 2005013235 A1 | 2/2005 |
|---|---|---|
| WO | 2007145564 A1 | 12/2007 |
| WO | 2009028558 A1 | 3/2009 |
| WO | 2009155228 A1 | 12/2009 |
| WO | 2011021046 A1 | 2/2011 |

OTHER PUBLICATIONS

Tiwari et al.: "Survival analysis: Pedestrian risk exposure at signalized intersections." Transportation Research Part F: Traffic Psychology and Behaviour, Pergamon, Amsterdam, NL, vol. 10, No. 2, Dec. 12, 2006, pp. 77-89, XP005802066, ISSN: 1369-8478, DOI: 10.1016/J.TRF.2006.06.002.

Extended European Search Report for EP Patent Application No. 11831503.5, dated Dec. 3, 2015.

"Fact Sheet: Beyond Traffic Signals: A Paradigm Shift Intersection Control for Autonomous Vehicles", [online]. [Retrieved Apr. 27, 2011]. Retrieved from the internet: <http://www.fhwa.dot.gov/advancedresearch/pubs/10023/index.cfm>, 3 pages.

"Google Cars Drive Themselves, in Traffic" [online]. [Retrieved Aug. 19, 2011] Retrieved from the internet: <http://www.nytimes.com/2010/10/10/science/10google.html>, 4 pages.

Carl Crane, David Armstrong, Antonio Arroyo, Antoin Baker, Doug Dankel, Greg Garcia, Nicholas Johnson, Jaesang Lee, Shannon Ridgeway, Eric Schwartz, Eric Thorn, Steve Velat, and Ji Hyun Yoon, Team Gator Nation's Autonomous Vehicle Development for The 2007 DARPA Urban Challenge, Dec. 2007, 27 pages.

Eric Guizzo, How's Google's Self-Driving Car Works, IEEE. Org, IEEE, Oct. 18, 2011, pp. 1/31/-31/31.

International Search Report and the Written Opinion for Application No. PCT/US 2011/054154, Apr. 24, 2012.

International Search Report and the Written Opinion for Application No. PCT/US 2011/054896, Apr. 25, 2012.

International Search Report and Written Opinion for Application No. PCT/US2013/061604 dated Jul. 3, 2014.

International Search Report and Written Opinion for Application No. PCT/US2011/054899 dated May 4, 2012.

Martin Schonhof, Martin Treiber, Arne Kesting, and Dirk Helbing, Autonomous Detection and Anticipation of Jam Fronts From Messages Propagated by Intervehicle Communication, 2007, pp. 3-12.

Matthew McNaughton, Motion Planning for Autonomous Driving with a Conformal Spatiotempral Lattice, Internation Conference on Robotics and Automation, May 9-13, pp. 4889-4895.

Vincenzo DiLecce and Marco Calabrese, Experimental System to Support Real-Time Driving Pattern Recognition, 2008, pp. 1192-1199.

* cited by examiner

CHANGE DETECTION USING CURVE ALIGNMENT

BACKGROUND

Autonomous vehicles, such as vehicles which do not require a human driver when operating in an autonomous driving mode, may be used to aid in the transport of passengers or items from one location to another. An important component of an autonomous vehicle is the perception system, which allows the vehicle to perceive and interpret its surroundings using cameras, radar, sensors, and other similar devices. The perception system executes numerous decisions while the autonomous vehicle is in motion, such as speeding up, slowing down, stopping, turning, etc. Autonomous vehicles may also use the cameras, sensors, and global positioning devices to gather and interpret images and sensor data about its surrounding environment, e.g., parked cars, trees, buildings, etc.

Information from the perception system may be combined with highly detailed map information in order to allow a vehicle's computer to safely maneuver the vehicle in various environments. This highly detailed map information may describe expected conditions of the vehicle's environment such as the shape and location of roads, traffic signals, and other objects. In this regard, the information from the perception system and detailed map information may be used to assist a vehicle's computer in making driving decisions involving intersections and traffic signals.

BRIEF SUMMARY

One aspect of the disclosure provides a computer-implemented method. The method includes receiving, by one or more computing devices, data identifying an object detected in a vehicle's environment. The data including location coordinates for the object. The method also includes identifying, by the one or more computing devices, a corresponding feature from pre-stored map information based on the location coordinates and a map location of the corresponding feature. The corresponding feature is defined as a curve and associated with a tag identifying a type of the corresponding object. The method includes identifying, by the one or more computing devices, a tolerance constraint based on the tag identifying the type of the corresponding object and dividing, by the one or more computing devices, the curve into two or more line segments. Each line segment of the two or more line segments has a first position. The method includes changing, by the one or more computing devices, the first position of the one of the two or more line segments to determine a second position of the one of the two or more line segments based on the location coordinates and the tolerance constraint. Changing the first position includes at least one of shifting or rotating the first position of the one of the two or more line segments. The method also includes determining, by the one or more computing devices, a value based on a comparison of the first position to the second position. The value indicates a likelihood that the corresponding feature has changed.

In one example, the corresponding feature is identified based on whether a distance between the location coordinates and the map location satisfies a threshold. In another example, the tolerance constraint limits at least one of the shifting or rotating of the one of the two or more line segments. In another example, the method also includes identifying a second tolerance constraint based on the tag identifying the type of the corresponding object, and changing the first position is further based on the second constraint, and the second tolerance constraint prohibits at least one of the shifting or rotating of the first position of the one of the two or more line segments. In another example, changing the first position includes both shifting and rotating the first position of the one of the two or more line segments. In another example, the method also includes comparing the value to a threshold values to determine whether the corresponding feature no longer exists. In another example, the method also includes comparing the value to a threshold values to determine whether the corresponding feature has been shifted. In another example, the method also includes before segmenting, determining whether the detected object used to define a driving lane based on the second type of the second corresponding object. In another example, the method also includes using, by the one or more processors, the value to maneuver the vehicle.

A further aspect of the disclosure provides a system including one or more computing devices. The one or more computing devices are configured to receive data identifying an object detected in a vehicle's environment. The data including location coordinates for the object. The one or more computing devices are also configured to identify a corresponding feature from pre-stored map information based on the location coordinates and a map location of the corresponding feature. The corresponding feature is defined as a curve and associated with a tag identifying a type of the corresponding object. The one or more computing devices are further configured to identify a tolerance constraint based on the tag identifying the type of the corresponding object and divide the curve into two or more line segments. Each line segment of the two or more line segments has a first position. The one or more computing devices are also configured to change the first position of the one of the two or more line segments to determine a second position of the one of the two or more line segments based on the location coordinates and the tolerance constraint. Changing the first position includes at least one of shifting or rotating the first position of the one of the two or more line segments. The one or more computing devices are configured to determine a value based on a comparison of the first position to the second position. The value indicates a likelihood that the corresponding feature has changed.

In one example, the corresponding feature is identified based on whether a distance between the location coordinates and the map location satisfies a threshold. In another example, the tolerance constraint limits at least one of the shifting or rotating of the one of the two or more line segments. In another example, the one or more computing devices are also configured to identify second tolerance constraint based on the tag identifying the type of the corresponding object, and to change the first position further based on the second constraint, and the second tolerance constraint prohibits at least one of the shifting or rotating of the first position of the one of the two or more line segments. In another example, the one or more computing devices are also configured to change the first position by both shifting and rotating the first position of the one of the two or more line segments. In another example, the one or more computing devices are further configured to compare the value to a threshold values to determine whether the corresponding feature no longer exists. In another example, the one or more computing devices are further configured to compare the value to a threshold values to determine whether the corresponding feature has been shifted. In another example, the one or more computing devices are also configured to, before segmenting, determine whether the detected object used to define a driving lane based on the second type of the second corresponding object. In another example, the system also includes the vehicle, and the one or more computing devices are further configured to maneuver the vehicle based on the value.

A further aspect of the disclosure provides a non-transitory, tangible computer readable medium on which instructions are stored. The instructions, when executed by one or more processors cause the one or more processors to perform a method. The method includes receiving data identifying an object detected in a vehicle's environment. The data including location coordinates for the object. The method also includes identifying a corresponding feature from pre-stored map information based on the location coordinates and a map location of the corresponding feature. The corresponding feature is defined as a curve and associated with a tag identifying a type of the corresponding object. The method includes identifying a tolerance constraint based on the tag identifying the type of the corresponding object and dividing the curve into two or more line segments. Each line segment of the two or more line segments has a first position. The method includes changing the first position of the one of the two or more line segments to determine a second position of the one of the two or more line segments based on the location coordinates and the tolerance constraint. Changing the first position includes at least one of shifting or rotating the first position of the one of the two or more line segments. The method also includes determining a value based on a comparison of the first position to the second position. The value indicates a likelihood that the corresponding feature has changed.

In one example, the corresponding feature is identified based on whether a distance between the location coordinates and the map location satisfies a threshold. In another example, the tolerance constraint limits at least one of the shifting or rotating of the one of the two or more line segments. In another example, the method also includes identifying a second tolerance constraint based on the tag identifying the type of the corresponding object, and changing the first position is further based on the second constraint, and the second tolerance constraint prohibits at least one of the shifting or rotating of the first position of the one of the two or more line segments. In another example, changing the first position includes both shifting and rotating the first position of the one of the two or more line segments. In another example, the method also includes comparing the value to a threshold values to determine whether the corresponding feature no longer exists. In another example, the method also includes comparing the value to a threshold values to determine whether the corresponding feature has been shifted. In another example, the method also includes before segmenting, determining whether the detected object used to define a driving lane based on the second type of the second corresponding object. In another example, the method also includes using, by the one or more processors, the value to maneuver the vehicle.

DETAILED DESCRIPTION

Overview

Figure 1:
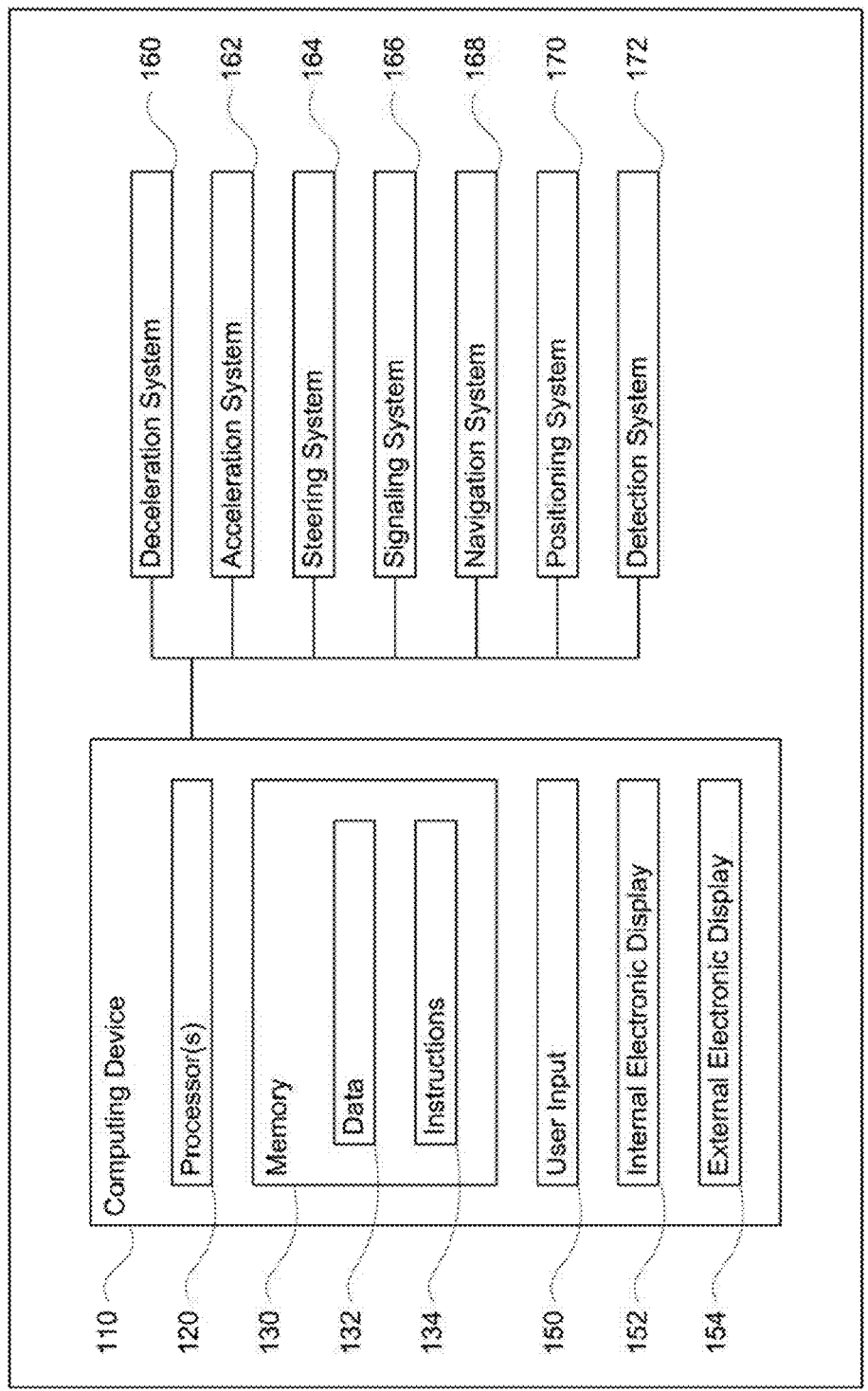
FIG. 1 is a functional diagram of a system in accordance with aspects of the disclosure.

The technology relates to determining a probability of changes between pre-stored map information and a current state of the world. The prior map may include pre-stored map information used to maneuver a vehicle autonomously. The more the vehicle can depend on the accuracy and detail of the pre-stored map information, the less the vehicle must detect for itself in real time. However, in order for this approach to be effective, the pre-stored map information must be accurate and up-to-date. Since this condition cannot be absolutely guaranteed, it is useful for an autonomous vehicle's computing devices to be able to detect relevant changes (and ignore some minor changes) between the pre-stored map information and a current state of the world. For example, the vehicle's computing devices may perform an optimization procedure that moves and morphs a curve in the pre-stored map information in an attempt to best align it with a corresponding portion of a detected object, while also trying to preserve the general shape of the curve and minimize the overall shift in position. From this, the vehicle's computing devices may determine the probability of changes between the pre-stored map information and a current state of the world.

The pre-stored map information may include information that describes the shapes and geographic location coordinates of features observed in the past. The features may include those that are used to define driving lanes for the vehicle such as lane markers, curbs, barriers, guard rails, or transitions from one type of road surface to another as well as other features such as crosswalks, signs, stopping lines, etc. Examples of lane markers may include painted lines, rumble strips, botts (round, non-raised reflective markers), and other types of reflectors. The shapes of these features may be described as curves. In addition, each feature may be associated with one or more tags. A tag may identify a type of the feature.

The autonomous vehicle may include an object detection system. This system may include a plurality of sensors which provide sensor data to the vehicle's computing devices. This sensor data may describe the shape and geographic location coordinates of objects detected in the vehicle's environment.

The geographic location coordinates of the detected object may be compared to the pre-stored map information in order to identify a corresponding feature. As an example, features having geographic location coordinates that are within a threshold distance (e.g., a few inches, a half meter, etc.) of the geographic location coordinates of the detected may be identified as a corresponding feature.

The curve of the corresponding feature may be divided into two or more segments. These segments may be described as a pair of points that correspond to a starting geographic location coordinate and an ending geographic location coordinate of the segment. These segments may also be described as a single point and a vector. As an example, each segment may be a predetermined distance, such as 0.5 meters or more or less. This predetermined distance may be selected based upon the underlying resolution of the sensor data, the pre-stored map information, computing resources of the vehicle's computing devices, etc.

Using the tag associated with the corresponding feature, a tolerance constraint may be identified. For example, the vehicle's computing devices may access a lookup table, database, matrix, etc. which relates each of the different tags of the pre-stored map information to tolerance constraints. A tolerance constraint may limit the amount a given segment can be shifted or rotated. For instance, the tolerance constraint may be related to the likelihood that the type of feature identified by the tag can change.

Each of the segments may then be repositioned in order to better align that segment with the location coordinates of a corresponding portion of the detected object given the restrictions of any tolerance constraints. This may include laterally shifting the position of the segment relative to the corresponding portion of the detected object. In addition or alternatively, the segment may be rotated about a center point. As noted above, the tolerance constraint may be used to limit the amount by which a segment can be shifted or rotated.

The location coordinates of the repositioned segments for a corresponding feature may then be compared to corresponding location coordinates of the curve of the corresponding feature of the pre-stored map information. Based on this comparison, a value indicative of a likelihood that the corresponding feature changed, or rather moved, may be determined. For example, the value may include a probability that some or all of the curve of the corresponding feature has changed. In this regard, a probability may be determined for each section or for a plurality of the sections based on the differences between the two positions of each segment and the clustering of those differences from different segments.

In the case where the probability of a change is very high, the vehicle's computing devices may also compute a value or probability that the corresponding feature of the pre-stored map information no longer exists in the current state of the world. For example, the probability that some or all of the curve of the corresponding feature has changed may be compared to one or more threshold values to determine whether the feature has merely shifted or if the feature no longer exists. These threshold values may be learned from training on actual data.

The vehicle's computing devices may use this probability in various ways. For example, if the probability is high and the change appears to be dramatic, the vehicle's computing devices may use this information to make driving decisions for the vehicle.

As described in more detail below, the aspects described herein may accommodate various alternatives. For example, before segmenting a corresponding feature, each of the objects detected in the vehicle's environment may be compared to the pre-stored map information to determine whether that detected object corresponds to a feature used to define a driving lane. In another example, rather than segmenting and repositioning the curve of a corresponding feature, an edge corresponding to the shape of the detected object may be segmented. As another example, when the probability that a corresponding feature has moved is very high, the detected object may be a new object in that it may not have a corresponding feature in the pre-stored map information. Similarly, a detected object that is identified as a new object may be used as a signal to indicate that another detected object is also a new object. In another example, when a detected object appears to have a corresponding feature that has shifted on top of another feature in the pre-store map information, the vehicle's computing devices may assume that there has been no change or simply ignore the change.

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor(s) 120. The memory 130 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 132 may be retrieved, stored or modified by processor(s) 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 120 may be any conventional processors, such as commercially available CPUs. Alternatively, the one or more processors may be a dedicated device such as an ASIC or other hardware-based processor, such as a field programmable gate array (FPGA). Although FIG. 1 functionally illustrates the processor(s), memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may have all of the components normally used in connection with a computing device such as the processor and memory described above, as well as a user input 150 (e.g., a mouse, keyboard, touch screen and/or microphone) and various electronic displays (e.g., a monitor having a screen, a small LCD touch-screen or any other electrical device that is operable to display information). In this example, the vehicle includes an internal electronic display 152. In this regard, internal electronic display 152 may be located within a cabin of vehicle 100 and may be used by computing device 110 to provide information to passengers within the vehicle 100.

In one example, computing device 110 may be an autonomous driving computing system incorporated into vehicle 100. The autonomous driving computing system may capable of communicating with various components of the vehicle as needed in order to control the vehicle in fully autonomous (without input from a driver) as well as semiautonomous (some input from a driver) driving modes.

Figure 2:
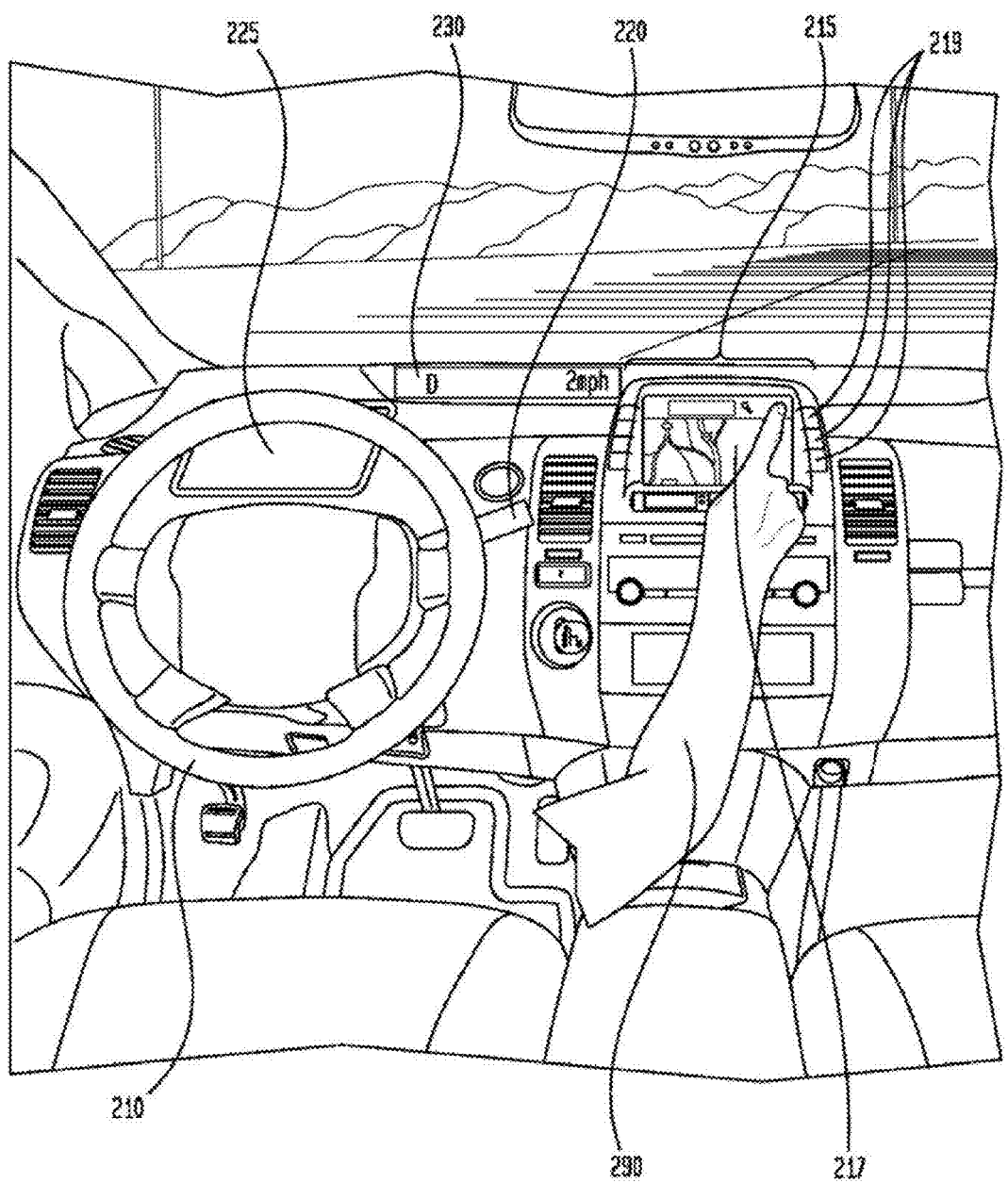
FIG. 2 is an interior of an autonomous vehicle in accordance with aspects of the disclosure.

As an example, FIG. 2 depicts an interior design of a vehicle having autonomous, semiautonomous, and manual (continuous input from a driver) driving modes. In this regard, the autonomous vehicle may include all of the features of a non-autonomous vehicle, for example: a steering apparatus, such as steering wheel 210; a navigation display apparatus, such as navigation display 215 (which may be a part of electronic display 152); and a gear selector apparatus, such as gear shifter 220. The vehicle may also have various user input devices 140 in addition to the foregoing, such as touch screen 217 (again, which may be a part of electronic display 152), or button inputs 219, for activating or deactivating one or more autonomous driving modes and for enabling a driver or passenger 290 to provide information, such as a navigation destination, to the computing device 110.

Returning to FIG. 1, when engaged, computer 110 may control some or all of these functions of vehicle 100 and thus be fully or partially autonomous. It will be understood that although various systems and computing device 110 are shown within vehicle 100, these elements may be external to vehicle 100 or physically separated by large distances.

In this regard, computing device 110 may be in communication various systems of vehicle 100, such as deceleration system 160, acceleration system 162, steering system 164, signaling system 166, navigation system 168, positioning system 170, and perception system 172, such that one or more systems working together may control the movement, speed, direction, etc. of vehicle 100 in accordance with the instructions 134 stored in memory 130. Although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 132 may store map information, e.g., highly detailed maps identifying the shapes, geographic location coordinates, and elevations of various objects that were previously observed such as roadways, features used to define driving lanes, intersections, crosswalks, traffic signals, buildings, signs, vegetation, or other such objects and information that the vehicle's computers may use to control the vehicle safely.

Examples of features may that are used to define driving lanes may include lane markers (painted lines, rumble strips, botts, etc.), curbs, barriers, guard rails, crosswalks, transitions from one type of road surface to another, or other such features. In some examples, the shapes of these features that are used to define driving lanes may be described as curves.

Figure 3:
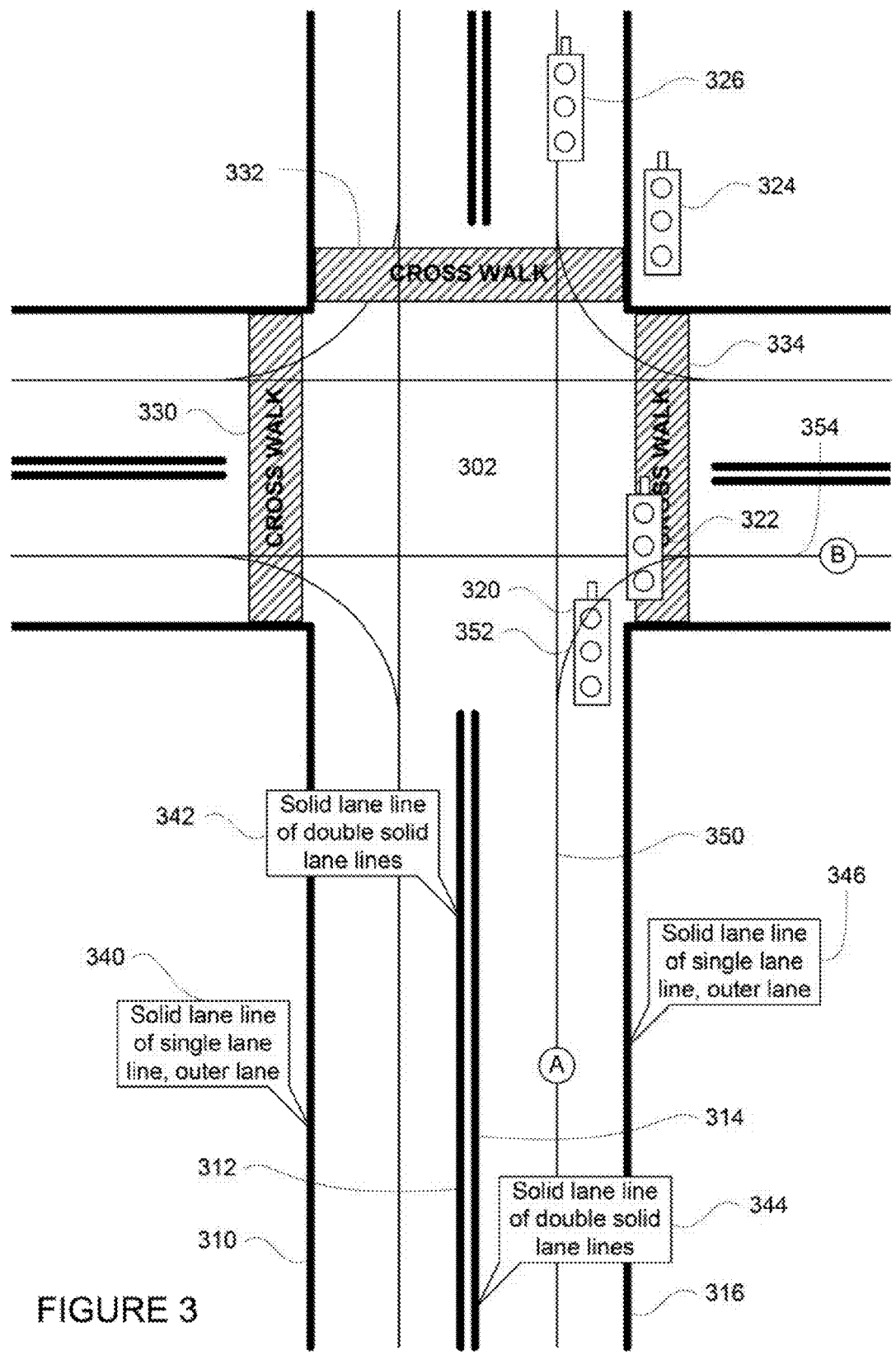
FIG. 3 is an example of map information in accordance with aspects of the disclosure.

FIG. 3 is an example of detailed map information 300 for a section of roadway including an intersection 302. In this example, the detailed map information 300 includes information identifying the shape, location, and other characteristics of lane lines 310, 312, 314, and 316 traffic signals 320, 322, 324, and 326, as well as crosswalks 330, 332, and 334. As noted above, the features used to define driving lanes, such as lane lines 310, 312, 314, and 316 may be associated with one or more tags.

In addition, each of these features may be associated with one or more tags identifying the specify type of that feature. In the example of FIG. 3, tags 340, 342, 344, and 346 each identify the type of the corresponding feature, here lane liens 310, 312, 314, and 316.

Each tag may be associated with a tolerance constraint. As described in more detail below, a tolerance constraint may limit the amount a feature of the map information can be shifted or rotated when comparing the map information to a detected object. These tolerance constraints may be hard constraints, e.g., a segment cannot be rotated more than 30 degrees in any direction or shifted more than one meter. In addition, the tolerance constraints may be soft constraints where a segment is penalized for rotating or shifting greater than some threshold. As an example, penalties define the tradeoff between improved the improved appearance of an alignment and how that alignment affects the geometry. For instance, penalties may be defined such that a portion of the curve can only move some small distance (such as 10 centimeters or more or less) if they newly aligned location appears to have a shape that is somewhat more like the proper feature type for that portion, but the same portion can be moved a greater distance (such as 1 meter or more or less) if they newly aligned location appears to have a shape that is significantly more like the proper feature type for that portion.

A tolerance constraint may then help to maintain the shape of a given curve. For example, along with penalty based on how much any one segment move or rotate, there may be penalties based on how the shape of connected segments changes. These penalties can be overcome when the changed positions of a portion of a curve suggests a change in shape, but are useful in many other cases to prevent a noisy detection from indicating a change when there is not one.

The tolerance constraints may be related to the likelihood that the type of feature identified by the tag will change. For example, the probability that painted line markers will move may be much higher than the probability that curbs will move (line marks are much more easily moved by repainting than curbs, which may require significantly more labor). Thus, in some instances, such as where the corresponding object is a type of feature which is unlikely to be moved, a tolerance constraint may prevent a segment from being shifted and/or rotated at all. This tolerance constraint may be included in the tag, associated with the tag in the map information, or stored in some other location such as a lookup table, database, matrix, etc. which relates each of the different tags of the map information to a tolerance constraint.

In addition, the detailed map information includes a network of rails 350, 352, and 354, which provide the vehicle's computer with guidelines for maneuvering the vehicle so that the vehicle follows the rails and obeys traffic laws. As an example, a vehicle's computer may maneuver the vehicle from point A to point B (two fictitious locations not actually part of the detailed map information) by following rail 340, transitioning to rail 342, and subsequently transitioning to rail 344 in order to make a left turn at intersection 302.

Figure 4:
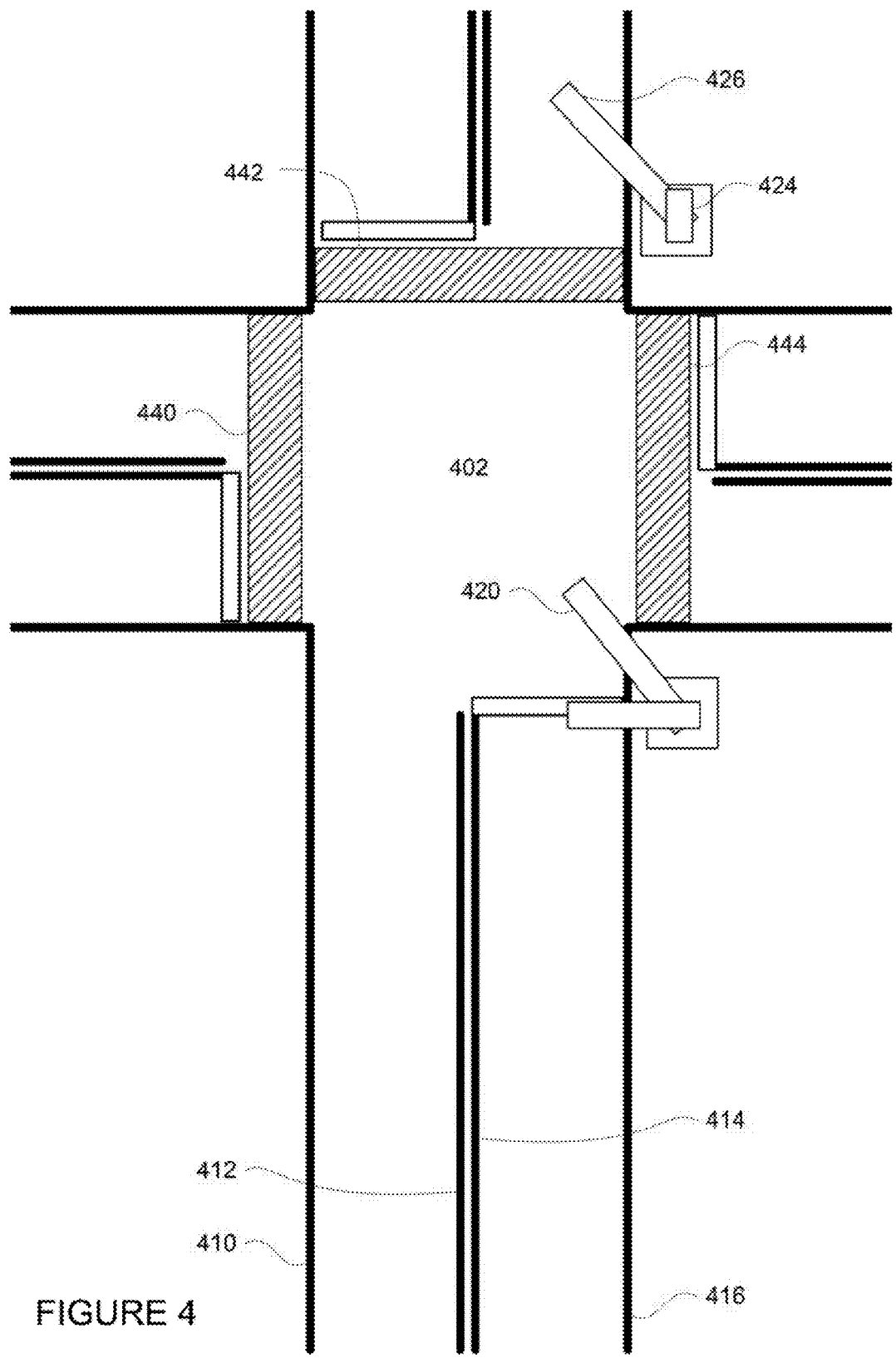
FIG. 4 is an example of an intersection in accordance with aspects of the disclosure.

As noted above, the map information may correspond to information observed in the past. In this regard, FIG. 4 is an example of a bird's eye view of an intersection that corresponds to the features of intersection 302. In this example, lane lines 410, 412, 414, and 416 correspond to the shape, location, and other characteristics of lane lines 310, 312, 314 and 316, respectively. Similarly crosswalks 430, 432, 434, and 436 correspond to the shape, location, and other characteristics of crosswalks 330, 332, and 334, respectively and traffic signals 420, 422, and 424, corresponds to the shape, location, and other characteristics of traffic signals 320, 322, and 324.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting and performing analysis on objects external to the vehicle such as other vehicles, obstacles in the roadway, traffic signals, signs, trees, etc. For example, the perception system 172 may include lasers, sonar, radar, one or more cameras, or any other detection devices which record data which may be processed by computing device 110. In the case where the vehicle is a small passenger vehicle such as a car, the car may include a laser mounted on the roof or other convenient location as well as other sensors such as cameras, radars, sonars, and additional lasers.

The computing device 110 may control the direction and speed of the vehicle by controlling various components. By way of example, if the vehicle is operating completely autonomously, computing device 110 may navigate the vehicle to a location using data from the detailed map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine or by applying brakes by deceleration system 160), change direction (e.g., by turning the front or rear wheels of vehicle 100 by steering system 164), and signal such changes (e.g. by lighting turn signals of signaling system 166).

Figure 5:
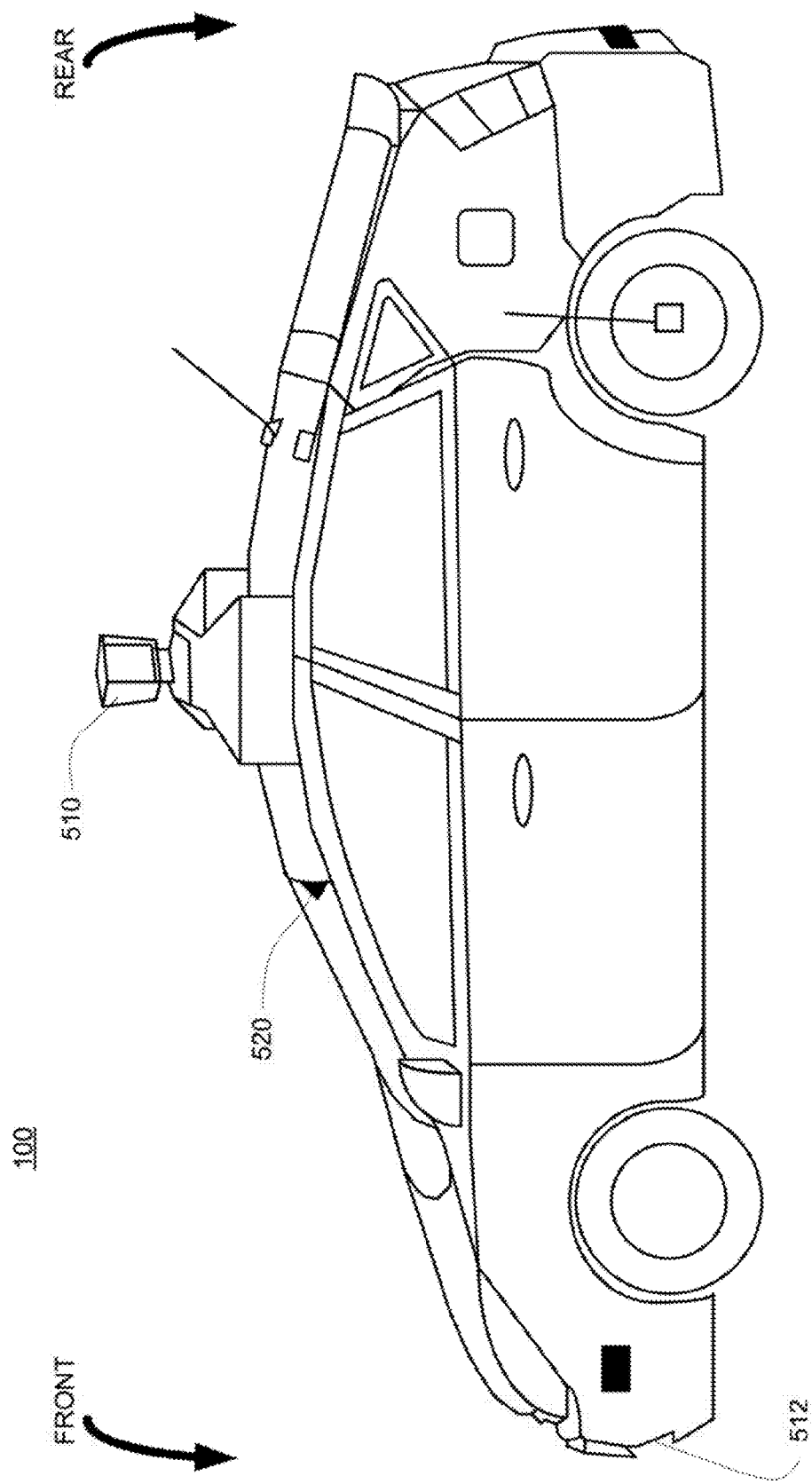
FIG. 5 is an exterior of an autonomous vehicle in accordance with aspects of the disclosure.

FIG. 5 is an example external view of vehicle 100 described above. As shown, various components of the perception system 172 may be positioned on or in the vehicle 100 in order to better detect external objects while the vehicle is being driven. In this regard, one or more sensors, such as laser range finders 510 and 512 may be positioned or mounted on the vehicle. As an example, the one or more computing devices 110 (not shown) may control laser range finder 510, e.g., by rotating it 180 degrees. In addition, the perception system may include one or more cameras 520 mounted internally on the windshield of vehicle 100 to receive and analyze various images about the environment. In addition to the laser range finder 510 is positioned on top of perception system 172 in FIG. 5, and the one or more cameras 520 mounted internally on the windshield, other detection devices, such as sonar, radar, GPS, etc., may also be positioned in a similar manner.

The one or more computing devices 110 may also features such as transmitters and receivers that allow the one or more devices to send and receive information to and from other devices. For example, the one or more computing devices may determine that the vehicle's environment has changed from an expected representation of the environment defined in the map information according to the aspects described herein. The one or more computing devices may send this information to other computing devise associated with other vehicles. Similarly, the one or more computing devices may receive such information from other computing devices.

This information may be sent and received via any wireless transmission method, such as radio, cellular, Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems and wireless interfaces.

EXAMPLE METHODS

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 6:
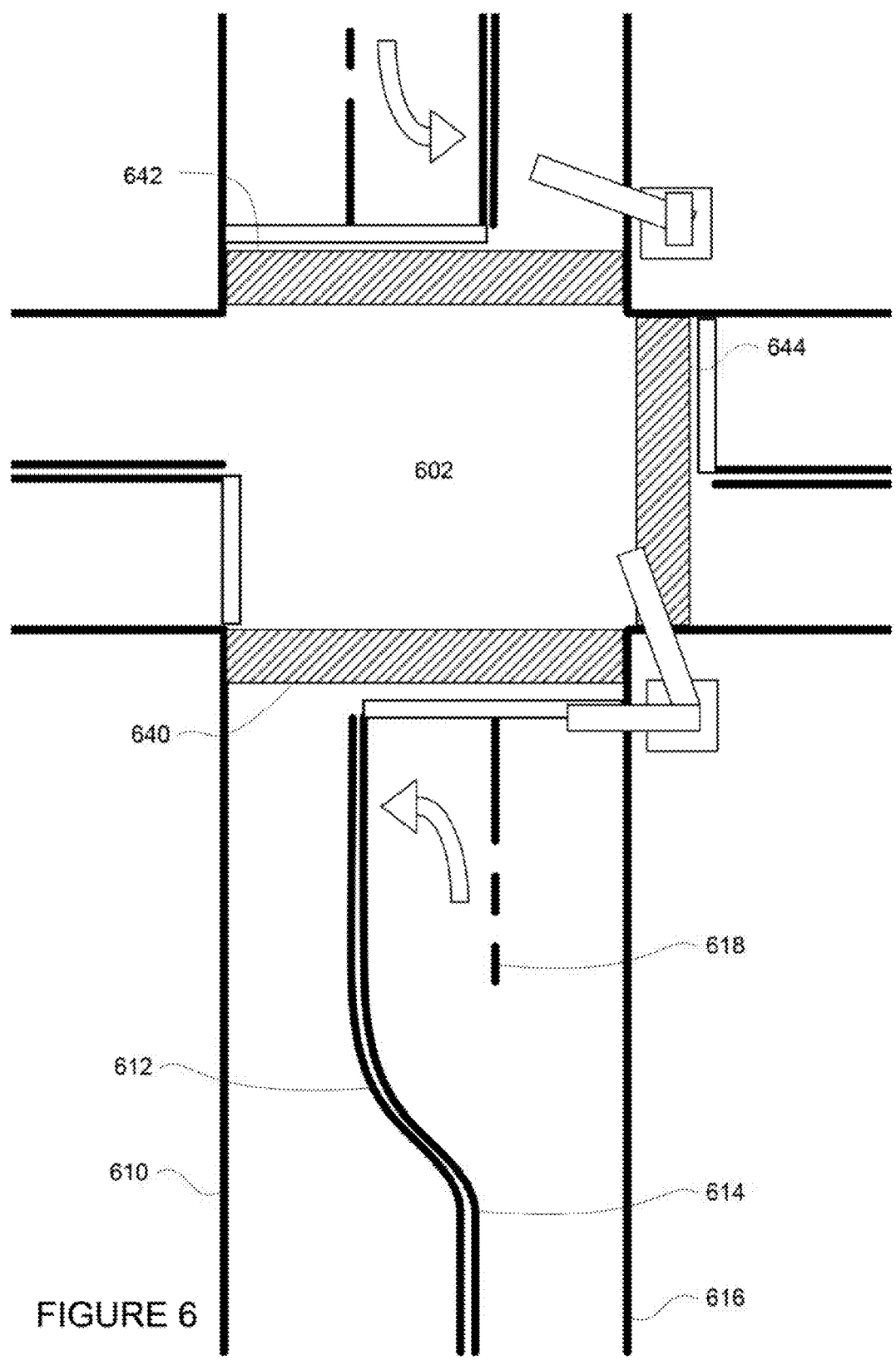
FIG. 6 is an example of objects identified by a perception system in accordance with aspects of the disclosure.

As noted above, a vehicle's one or more computing devices may maneuver the vehicle using the various systems described above. While doing so, the perception system 172 may identify the shape and location of various objects in the vehicle's environment. For example, FIG. 6 depicts a section of roadway 600 including an intersection 602 identified by the perception system 172 from sensor data (e.g., lasers, cameras, radar, sonar, etc.). In this example, the perception system 172 has identified the shape and geographic location coordinates of various features such as lane lines 610, 612, 614, 616 and 618 as well as crosswalks 630, 632, and 634. In this example, the general location of intersection 602 may correspond to the location of intersection 302, however as can be seen there are various changes to the vehicle's environment. Here a left hand turning lane has been added, the roadway has been widened, and the location and placement of various crosswalks has changed.

Figure 7:
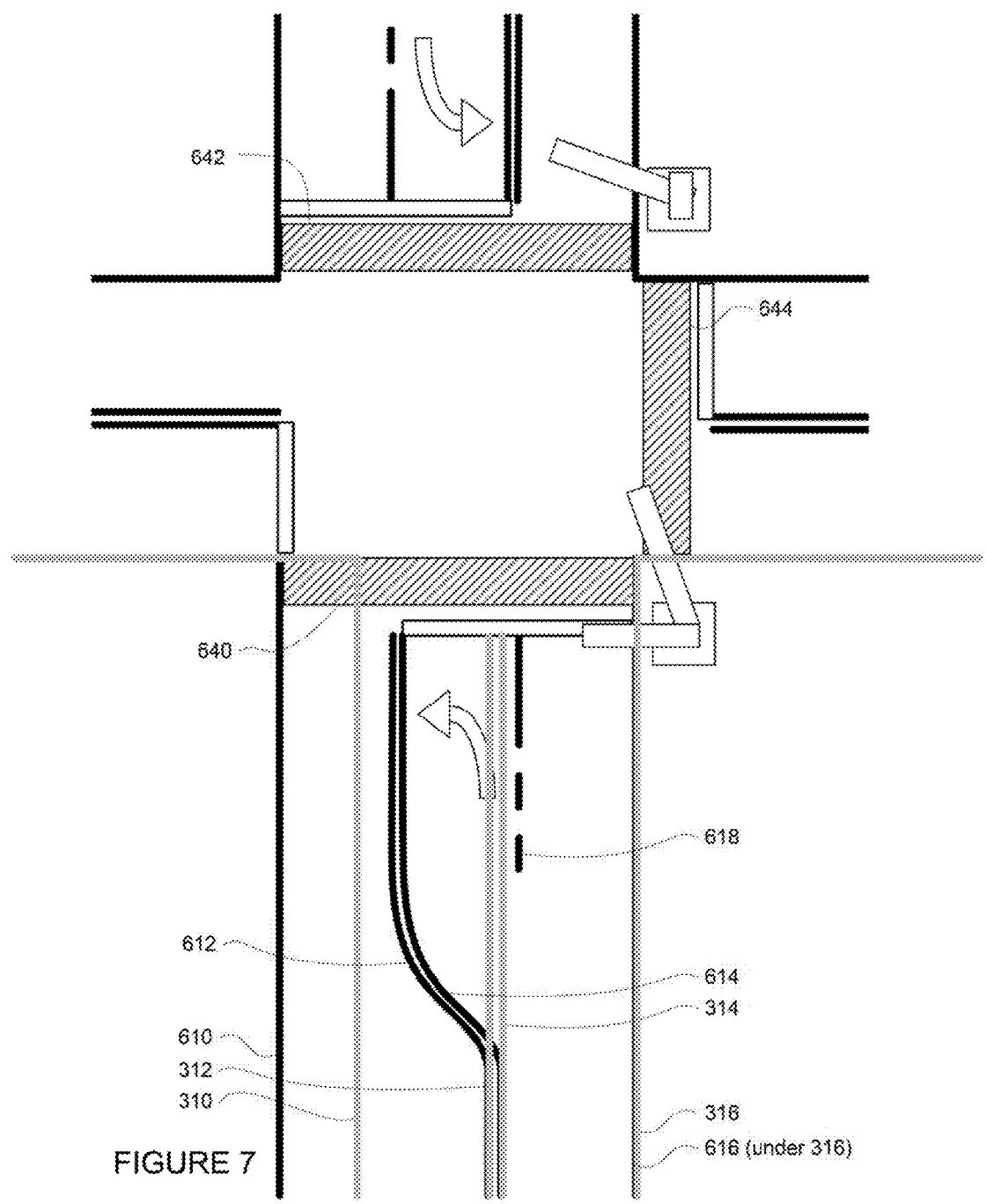
FIG. 7 is a comparison of the objects of FIG. 7 as compared to features of the map information of FIG. 3 in accordance with aspects of the disclosure.
Figure 8:
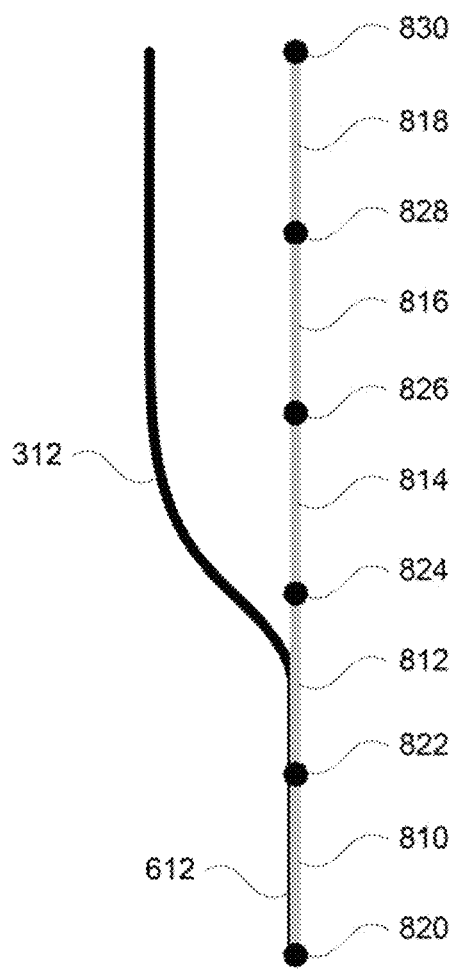
FIG. 8 is another comparison of an object of FIG. 7 to features of the map information of FIG. 3 in accordance with aspects of the disclosure.

The geographic location coordinates of the detected object may be compared to the map information in order to identify corresponding features between the map information and the objects detected by the perception system. As an example, features having at least some geographic location coordinates that are within a threshold distance (e.g., a few inches, a half meter, etc.) of the geographic location coordinates of a detected object may be identified as a corresponding feature. For example, FIG. 8 is a comparison of shapes and geographic location coordinates of lane lines 310, 312, 314, and 316 to the detected objects of FIG. 7. In this example, lane lines 312 and 612, 314 and 614, as well as 316 and 616 may be identified as corresponding features because of their close proximity to one another. In this example, however, only a portion of lane lines 312 and 316 are proximate to one another though they may still be identified as corresponding features.

The curve of the corresponding feature of the map information may be divided into two or more segments. For example, FIG. 8 is a representation of lane lines 312 (identified from the map information) and 612 (a detected object). Here lane line 612 is shown as divided into segments 810, 812, 814, 816, and 818.

These segments may be described as a pair of points that correspond to a starting geographic location coordinate and an ending geographic location coordinate of the segment. Thus, each of the segments 810, 812, 814, 816, and 818 is bounded by two of end points 820, 822, 824, 826, 828, and 830. Each of these end points represents geographic location coordinates for the ending location of a corresponding segment. For example, segment 810 is bounded and defined by by the geographic location coordinates of end points 820 and 822, segment 812 is bounded and defined by by the geographic location coordinates of end points 822 and 824, etc. Alternatively, the segments may also be described as a single point and a vector.

As an example, each segment may be a predetermined distance. For example, lane line 612 may be divided into segments 810, 812, 814, 816, and 818 that are each 0.5 meters or more or less. This predetermined distance may be selected based upon the underlying resolution of the sensor data, the pre-stored map information, computing resources of the vehicle's computing devices, etc.

Figure 9:
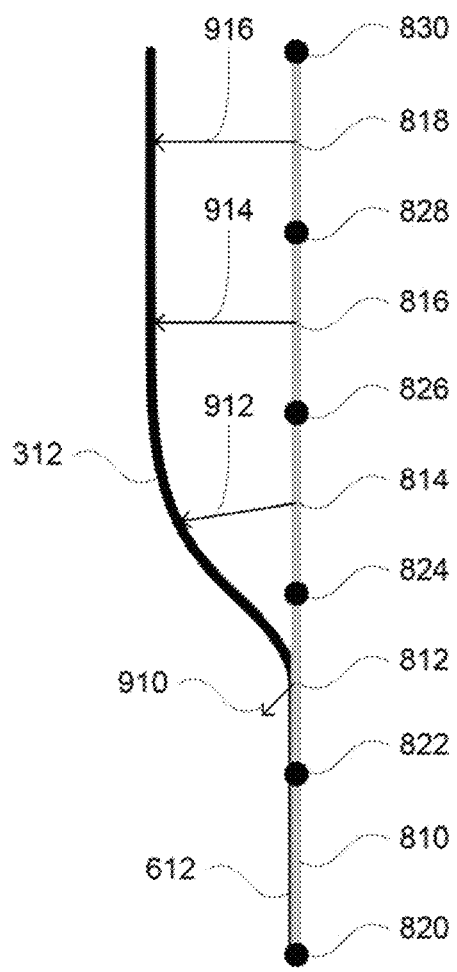
FIG. 9 is a further comparison of an object of FIG. 7 to features of the map information of FIG. 3 in accordance with aspects of the disclosure.

Each of the segments may then be repositioned in order to better align that segment with the location coordinates of a corresponding portion of the detected object given the restrictions of any tolerance constraints. This may include laterally shifting the position of the segment relative to the corresponding portion of the detected object. In addition or alternatively, the segment may be rotated about a center point. FIG. 9 depicts the segments of lane line 612 as well as lane line 312 with arrows 910, 912, 914, and 916 indicating the direction of any shifting or rotating needed to move the geographic location coordinates of segments of lane line 612 to the geographic location coordinates of lane line 312. In this example, segment 810 does not need to be shifted or rotated, segment 812 needs to be shifted and rotated in the direction of arrow 910, segment 814 needs to be shifted and rotated in the direction of arrow 912, and segments 816 and 818 need to be shifted in the directions of arrows 912 and 914, respectively in order to better align the segments of lane line 612 with the lane line 312.

In some examples, a tolerance constraint may then be identified. For example, the vehicle's computing devices may use the tag associated with a map feature to identify a tolerance constraints. As noted above, this information may be included in the tag, associated with the tag, or stored in some other location.

Figure 10A:
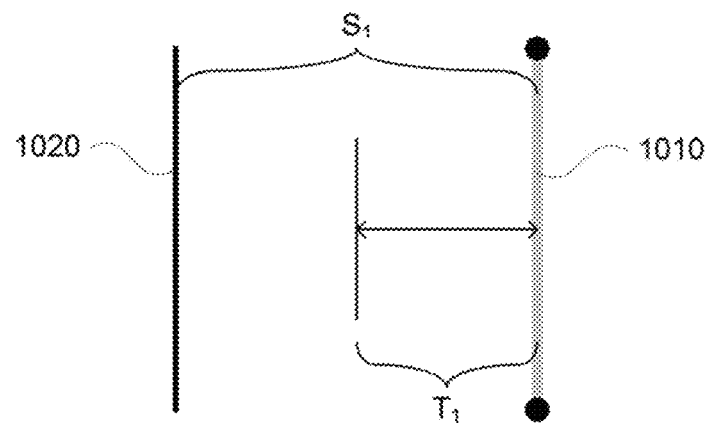
FIGS. 10A and 10B are examples of tolerance constraints in accordance with aspects of the disclosure.
Figure 10B:
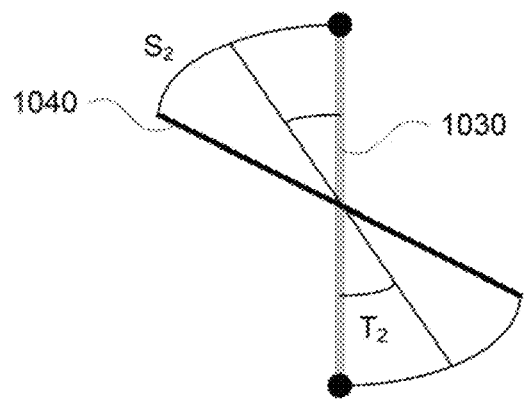

As noted above, a tolerance constraint may be used to limit the amount by which a segment can be shifted or rotated. FIG. 10A is an example of a tolerance constraint that limits the amount a given segment can be shifted. In this example, segment 1010 is compared to the location of feature 1020 of the map information. Segment 1010 and feature 1020 are a distance S1 apart from one another. However, the tolerance constraint limits the distance that segment 1010 can be shifted towards feature 1020 to the distance T1.

Similarly, FIG. 10A is an example of a tolerance constraint that limits the amount a given segment can be rotated. In this example, segment 1030 is compared to the location of feature 1040 of the map information. Segment 1030 and feature 1040 are an angular distance S2 apart from one another. However, the tolerance constraint limits the degree to which that segment 1040 can be rotated towards feature 1040 to the angular distance T2.

Figure 11:
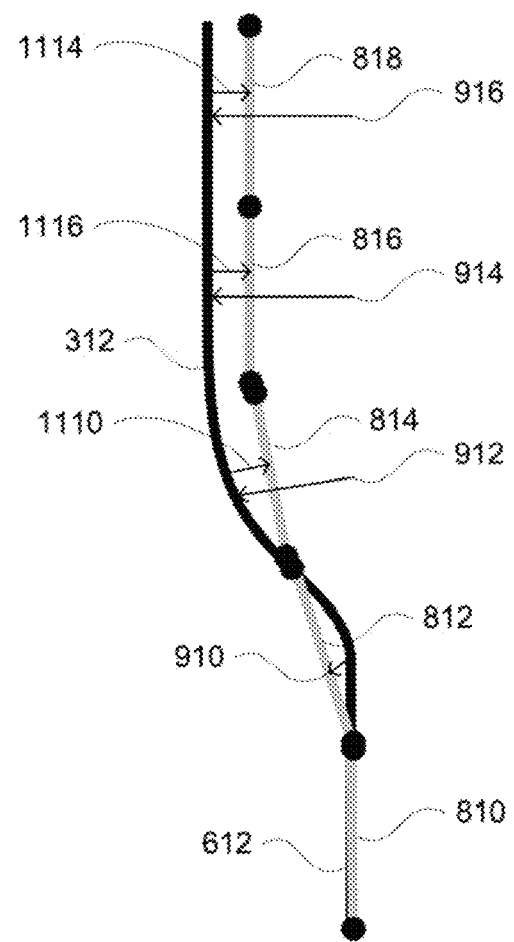
FIG. 11 is an example of adjusting a location of a feature of the map information using a tolerance constraint.

Thus, each of the segments may be repositioned in order to better align that segment with the location coordinates of a corresponding portion of the detected object given the restrictions of any tolerance constraints. FIG. 11 depicts an example of shifting and rotating segments using tolerance constraints. In this example, tolerance constraint 1110 limits the rotation and shifting of segment 814 along arrow 912, tolerance constraint 1112 limits the shifting of segment 816 along arrow 912, and tolerance constraint 1110 limits the shifting of segment 816 along arrow 914. In this example, the tolerance constraints for lane line 312 do not affect the shifting and rotating of segments 812. In this example, the amount of shifting and rotating needed for segment 812 may be within the tolerance constraint for lane lien 312.

By shifting and rotating the segments, the end points of the segments will have new geographic location coordinates as can be seen from the example of FIG. 11. The geographic location coordinates of the repositioned segments for a corresponding feature may then be compared to corresponding geographic location coordinates of the curve of the corresponding feature of the pre-stored map information. Based on this comparison, a value indicative of a likelihood that the corresponding feature changed, or rather moved, may be determined. For example, the value may include a probability that some or all of the curve of the corresponding feature has changed. In this regard, a probability may be determined for each section or for a plurality of the sections based on the differences between the two positions of each segment and the clustering of those differences from different segments.

In the case where the probability of a change is very high, the vehicle's computing devices may also compute a value or probability that the corresponding feature of the pre-stored map information no longer exists in the current state of the world. For example, the probability that some or all of the curve of the corresponding feature has changed may be compared to one or more threshold values to determine whether the feature has merely shifted or if the feature no longer exists. These threshold values may be learned from training on actual data.

In another example, rather than relying on when the probability of a change for a feature being very high, if a good new location for a set of segments from the detailed map information is not found, then sensor data corresponding to the original location of the segments may be checked to see if the proper feature was detected there. If it was not, this may indicate that the feature had been completely removed.

The vehicle's computing devices may use this probability in various ways. For example, if the probability is high and the change appears to be dramatic, the vehicle's computing devices may use this information to make driving decisions for the vehicle. This may include slowing the vehicle down, maneuvering the vehicle in a more cautious mode, stopping the vehicle (e.g., to protect the safety of passengers), requesting that a passenger of the vehicle take control of the vehicle, etc. The vehicle's computing devices may also save the probability information, share the information with other autonomous vehicles, send the information to a system operator or centralized computing device for review and possible incorporation into the pre-stored map information, etc.

Although the examples of FIGS. 7-11 relate to lane markers, the aspects described above for aligning and determining probabilities may be used to with regard other types of features in the detailed map information. For example, such aspects may also be especially useful with regard to detecting changes in the location of crosswalks and stop lines.

Figure 12:
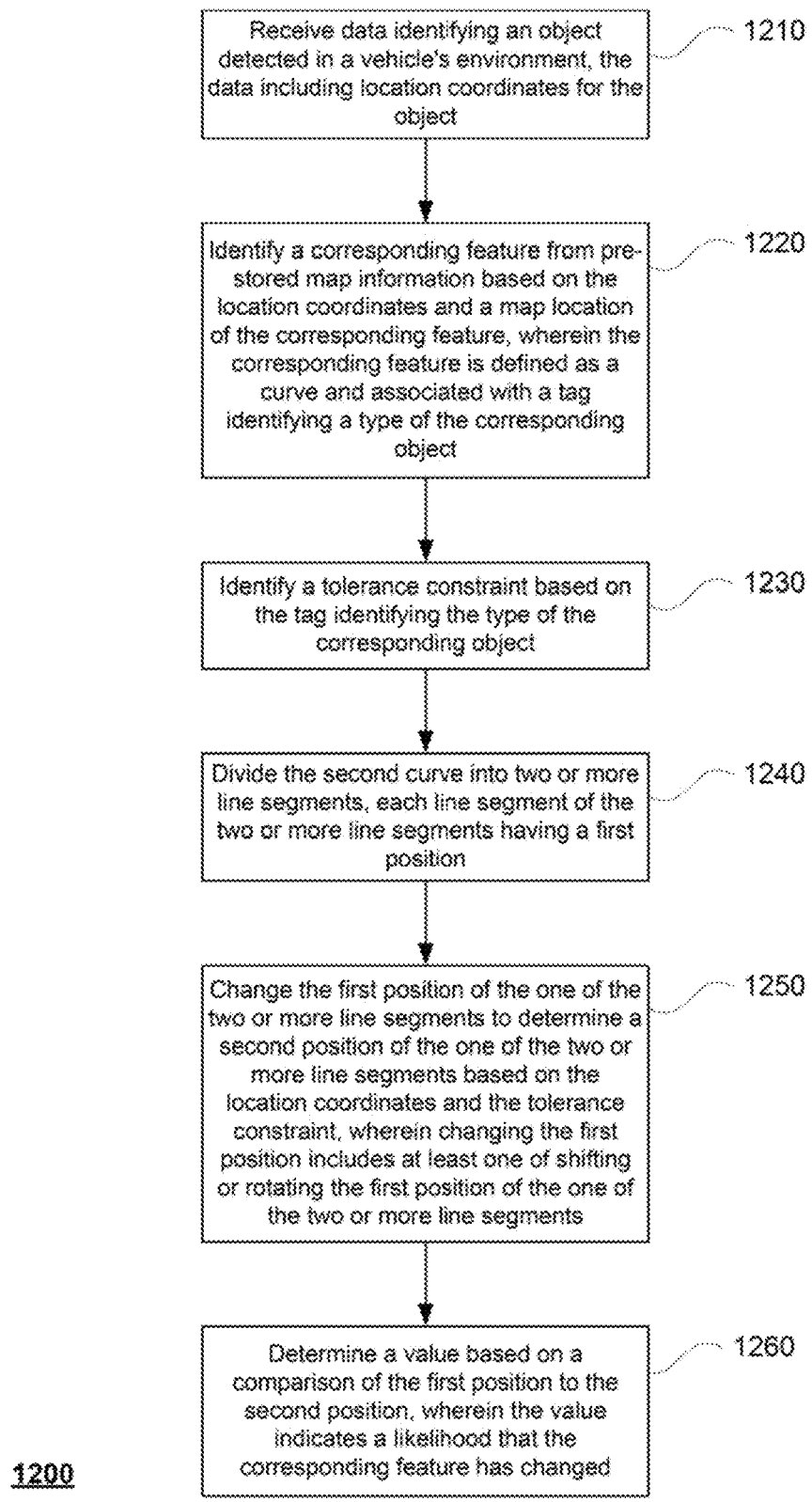
FIG. 12 is an example flow diagram in accordance with aspects of the disclosure.

FIG. 12 is an example flow diagram 1200 which depicts some of the aspects described above which may be performed by one or more computing devices such as one or more computing devices 110 of vehicle 100. In this example, data identifying an object detected in a vehicle's environment is received at block 1210. This data includes location coordinates for the object. A corresponding feature is identified from pre-stored map information based on the location coordinates and a map location of the corresponding feature at block 1220. This corresponding feature is defined as a curve and associated with a tag identifying a type of the corresponding object. A tolerance constraint is identified based on the tag identifying the type of the corresponding object at block 1230. The second curve is divided into two or more line segments at block 1240. Each line segment of the two or more line segments has a first position. The first position of the one of the two or more line segments is changed to determine a second position of the one of the two or more line segments based on the location coordinates and the tolerance constraint at block 1250. Changing the first position includes at least one of shifting or rotating the first position of the one of the two or more line segments. A value is then determined based on a comparison of the first position to the second position at block 1260. This value indicates a likelihood that the corresponding feature has changed.

As noted above, the aspects described herein may accommodate various alternatives. For example, before segmenting a corresponding feature, each of the objects detected in the vehicle's environment may be compared to the pre-stored map information to determine whether that detected object corresponds to a feature used to define a driving lane. This may be achieved by comparing the location information of the sensor data for the detected object to the location information of the pre-stored map to identify a corresponding feature. Then based on the tag associated with the corresponding feature, the vehicle's computing device may determine whether the detected object corresponds to the location of a feature used to define driving lanes. If so, the corresponding feature may be segmented and processed as described above, and if not, the corresponding feature need not be segmented or processed as described above.

Alternatively, rather than segmenting and repositioning the curve of a corresponding feature, an edge of the detected object may be segmented. The segments of the edge may then be shifted or rotated to better align the segment to the curve of the corresponding feature. Again, the tolerance constraint identified based on the tag of the corresponding feature may be used to limit the shifting and/or rotation of the segment. The location coordinates of the repositioned segments for the edge may then be compared to the corresponding location coordinates of the edge of the detected object (before the segment was repositioned). Based on this comparison, various values may be determined as described above.

In some examples, the detected object may be a new object in that it may not have a corresponding feature in the pre-stored map information. In this case, other features of the pre-stored map information may be used as signals to indicate additional characteristics of detected objects not readily detectable from the location and orientation characteristics of the detected objects. For example, if a new driving lane was added, the boundaries for that new driving lane may have a similar angle and heading as the boundaries for any previous driving lane or lanes in the pre-stored map information that are also in the same general area. In that regard, if a detected object appears to follow the general shape of the boundaries of a curve corresponding to a lane line in the pre-stored map information but appears in another location, the vehicle's computing devices may determine that the detected object corresponds to a lane line which is likely to have a heading that corresponds to the heading of the lane lines in the pre-stored map information.

Similarly, one detected object that is identified as a new object may be used as signals to indicate that another detected object is also a new object. For example, if a new crosswalk or a new bike lane is detected, for example using image matching or other identification techniques, the likelihood that other features in that immediate area changed may be relatively high. Thus, the vehicle's computing devices may be more likely to determine that another detected object is a new object.

In some instances, when a detected object appears to have a corresponding feature that has shifted on top of another feature in the pre-store map information, the vehicle's computing devices may assume that there has been no change or simply ignore the change. For example, in the case of a solid double lane line, one of the lane lines may be more faded than the other making it more difficult for the vehicle's detection system to detect the faded lane line. This may cause the vehicle's computing devices to determine that one of the lane lines has shifted on top of another, when actually there has been no change. Thus, in this example, the vehicle's computing devices may assume that there has been no change or simply ignore the change.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method comprising:
receiving, by one or more computing devices, data identifying an object detected in a vehicle's environment, the data including location coordinates for the object;
identifying, by the one or more computing devices, a corresponding feature from pre-stored map information based on the location coordinates and a map location of the corresponding feature, wherein the corresponding feature is defined as a curve and associated with a tag identifying a type of the corresponding object;
identifying, by the one or more computing devices, a tolerance constraint based on the tag identifying the type of the corresponding object;
dividing, by the one or more computing devices, the curve into two or more line segments, each line segment of the two or more line segments having a first position;
changing, by the one or more computing devices, the first position of the one of the two or more line segments to determine a second position of the one of the two or more line segments based on the location coordinates and the tolerance constraint, wherein changing the first position includes at least one of shifting or rotating the first position of the one of the two or more line segments;
determining, by the one or more computing devices, a value based on a comparison of the first position to the second position, wherein the value indicates a likelihood that the corresponding feature has changed; and
using, by the one or more processors, the value to maneuver the vehicle in an autonomous driving mode.

2. The method of claim 1, wherein the corresponding feature is identified based on whether a distance between the location coordinates and the map location satisfies a threshold.

3. The method of claim 1, wherein the tolerance constraint limits the at least one of the shifting or rotating of the one of the two or more line segments.

4. The method of claim 1, further comprising:
identifying a second tolerance constraint based on the tag identifying the type of the corresponding object, and
wherein changing the first position is further based on the second constraint, and the second tolerance constraint prohibits at least one of the shifting or rotating of the first position of the one of the two or more line segments.

5. The method of claim 1, wherein changing the first position includes both shifting and rotating the first position of the one of the two or more line segments.

6. The method of claim 1, further comprising comparing the value to a threshold values to determine whether the corresponding feature no longer exists.

7. The method of claim 1, further comprising comparing the value to a threshold values to determine whether the corresponding feature has been shifted.

8. The method of claim 1, before dividing, determining whether the detected object used to define a driving lane based on the second type of the second corresponding object.

9. A system comprising one or more computing devices, each having one or more processors configured to:
receive data identifying an object detected in a vehicle's environment, the data including location coordinates for the object;
identify a corresponding feature from pre-stored map information based on the location coordinates and a map location of the corresponding feature, wherein the corresponding feature is defined as a curve and associated with a tag identifying a type of the corresponding object;
identify a tolerance constraint based on the tag identifying the type of the corresponding object;
divide the curve into two or more line segments, each line segment of the two or more line segments having a first position;
change the first position of the one of the two or more line segments to determine a second position of the one of the two or more line segments based on the location coordinates and the tolerance constraint, wherein changing the first position includes at least one of shifting or rotating the first position of the one of the two or more line segments; and
determine a value based on a comparison of the first position to the second position, wherein the value indicates a likelihood that the corresponding feature has changed; and
use the value to maneuver the vehicle in an autonomous driving mode.

10. The system of claim 9, wherein the corresponding feature is identified based on whether a distance between the location coordinates and the map location satisfies a threshold.

11. The system of claim 9, wherein the tolerance constraint limits the at least one of the shifting or rotating of the one of the two or more line segments.

12. The system of claim 9, wherein the one or more computing devices are further configured to:
identify second tolerance constraint based on the tag identifying the type of the corresponding object, and
to change the first position further based on the second constraint, and the second tolerance constraint prohibits at least one of the shifting or rotating of the first position of the one of the two or more line segments.

13. The system of claim 9, wherein the one or more computing devices are further configured to change the first position by both shifting and rotating the first position of the one of the two or more line segments.

14. The system of claim 9, wherein the one or more computing devices are further configured to compare the value to a threshold values to determine whether the corresponding feature no longer exists.

15. The system of claim 9, wherein the one or more computing devices are further configured to compare the value to a threshold values to determine whether the corresponding feature has been shifted.

16. The system of claim 9, wherein the one or more computing devices are further configured to, before dividing, determine whether the detected object used to define a driving lane based on the second type of the second corresponding object.

17. A non-transitory, tangible computer readable medium on which instructions are stored, the instructions, when executed by one or more processors cause the one or more processors to perform a method, the method comprising:
receiving data identifying an object detected in a vehicle's environment, the data including location coordinates for the object;
identifying a corresponding feature from pre-stored map information based on the location coordinates and a map location of the corresponding feature, wherein the corresponding feature is defined as a curve and associated with a tag identifying a type of the corresponding object;
identifying a tolerance constraint based on the tag identifying the type of the corresponding object;
dividing the curve into two or more line segments, each line segment of the two or more line segments having a first position;

changing the first position of the one of the two or more line segments to determine a second position of the one of the two or more line segments based on the location coordinates and the tolerance constraint, wherein changing the first position includes at least one of shifting or rotating the first position of the one of the two or more line segments;

determining a value based on a comparison of the first position to the second position, wherein the value indicates a likelihood that the corresponding feature has changed; and using the value to maneuver the vehicle in an autonomous driving mode.

18. The system of claim 9, further comprising the vehicle.

19. The medium of claim 17, wherein the tolerance constraint limits the at least one of the shifting or rotating of the one of the two or more line segments.

20. The medium of claim 7, wherein the one or more processors are further configured to change the first position by both shifting and rotating the first position of the one of the two or more line segments.

* * * * *